(12) United States Patent
Kogan et al.

(10) Patent No.: US 7,097,101 B2
(45) Date of Patent: Aug. 29, 2006

(54) INTERFACE FOR INTERFACING AN IMAGING ENGINE TO AN OPTICAL CODE READER

(75) Inventors: Eduard Kogan, Howard Beach, NY (US); Joseph Giordano, Bayville, NY (US); Andrei Shamkovich, New York, NY (US); Heng Zhang, Holbrook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/694,425

(22) Filed: Oct. 27, 2003

(65) Prior Publication Data

US 2004/0159703 A1 Aug. 19, 2004

Related U.S. Application Data

(63) Continuation-in-part of application No. 10/459,935, filed on Jun. 12, 2003.

(60) Provisional application No. 60/460,370, filed on Apr. 4, 2003, provisional application No. 60/447,093, filed on Feb. 13, 2003.

(51) Int. Cl.
*G06K 7/10* (2006.01)

(52) U.S. Cl. .................. 235/454; 235/435; 235/462.15; 235/462.21; 235/462.23; 235/462.37; 235/462.45; 235/472.01; 235/472.02; 235/472.03

(58) Field of Classification Search ............... 235/454, 235/462.2, 462.38, 462.44, 462.23, 462.15, 235/462.37, 462.45, 462.21, 435, 472.01–472.03; 250/201.4; 348/207.99, 376, 143, 362, 345; 359/215, 196; 351/219
See application file for complete search history.

(56) References Cited

U.S. PATENT DOCUMENTS

| 4,136,821 | A | * | 1/1979 | Sugiura et al. | ........ 235/462.23 |
| 4,251,798 | A | | 2/1981 | Swartz et al. | ............ 340/146.3 |
| 4,762,985 | A | * | 8/1988 | Imai et al. | ................ 250/201.4 |
| 4,874,933 | A | * | 10/1989 | Sanner | ........................ 235/435 |
| 4,897,532 | A | * | 1/1990 | Swartz et al. | ........... 235/462.21 |
| 4,920,255 | A | * | 4/1990 | Gabeler | ........................ 235/454 |
| 4,957,348 | A | * | 9/1990 | May | ........................ 235/462.15 |
| 5,007,729 | A | * | 4/1991 | Erickson et al. | ............. 351/219 |
| 5,117,137 | A | | 5/1992 | Kobayashi | ..................... 235/472 |
| 5,198,648 | A | | 3/1993 | Hibbard | ..................... 235/462 |
| 5,308,960 | A | * | 5/1994 | Smith et al. | .................. 235/454 |
| 5,502,564 | A | * | 3/1996 | Ledger | ........................ 356/503 |
| 5,561,283 | A | | 10/1996 | Dvorkis et al. | ............. 235/462 |
| 5,602,379 | A | * | 2/1997 | Uchimura et al. | ...... 235/462.15 |

(Continued)

FOREIGN PATENT DOCUMENTS

WO WO 01/29836 A 4/2001

(Continued)

*Primary Examiner*—Thien M. Le
*Assistant Examiner*—Allyson N Trail
(74) *Attorney, Agent, or Firm*—Carter DeLuca Farrell & Schmidt, LLP

(57) ABSTRACT

An optical code reader having means for focusing an imaging optics assembly on a target image. The optical code reader includes a chassis and an imaging optics assembly pivotally mounted on the chassis. The imaging optics assembly is housed within an opto-mechanical barrel assembly. Pivotal movement of the opto-mechanical barrel assembly adjusts the focus of the imaging optics assembly on a target image. The optical code reader further includes an illumination device and an aiming device.

20 Claims, 10 Drawing Sheets

U.S. PATENT DOCUMENTS

| | | | |
|---|---|---|---|
| 5,780,834 A | 7/1998 | Havens et al. | 235/472 |
| 5,796,089 A | 8/1998 | Marom | 310/49 |
| 5,932,860 A * | 8/1999 | Plesko | 235/454 |
| 6,053,413 A * | 4/2000 | Swift et al. | 235/472.01 |
| 6,066,857 A * | 5/2000 | Fantone et al. | 250/566 |
| 6,098,887 A * | 8/2000 | Figarella et al. | 235/472.01 |
| 6,141,051 A * | 10/2000 | Koch et al. | 348/345 |
| 6,182,898 B1 * | 2/2001 | Schmidt et al. | 235/462.45 |
| 6,186,400 B1 * | 2/2001 | Dvorkis et al. | 235/462.45 |
| 6,223,986 B1 * | 5/2001 | Bobba et al. | 235/462.2 |
| 6,230,976 B1 * | 5/2001 | Sautter et al. | 235/462.36 |
| 6,283,371 B1 * | 9/2001 | Son | 235/462.32 |
| 6,327,103 B1 * | 12/2001 | Belliveau et al. | 359/819 |
| 6,340,114 B1 | 1/2002 | Correa et al. | 235/462.22 |
| 6,405,926 B1 * | 6/2002 | Yomogida et al. | 235/462.46 |
| 6,478,225 B1 * | 11/2002 | Swartz et al. | 235/462.22 |
| 6,522,441 B1 * | 2/2003 | Rudeen | 359/196 |
| 6,597,465 B1 * | 7/2003 | Jarchow et al. | 358/1.12 |
| 6,637,655 B1 * | 10/2003 | Hudrick et al. | 235/462.14 |
| 6,729,546 B1 * | 5/2004 | Roustaei | 235/462.45 |
| 2001/0003346 A1 * | 6/2001 | Feng | 235/472.01 |
| 2002/0011520 A1 * | 1/2002 | Gurevich et al. | 235/462.21 |
| 2002/0085260 A1 * | 7/2002 | Huang et al. | 359/196 |
| 2002/0131139 A1 * | 9/2002 | Mandella et al. | 359/215 |
| 2004/0031850 A1 * | 2/2004 | Shellhammer | 235/462.1 |
| 2004/0118927 A1 * | 6/2004 | Breytman et al. | 235/462.37 |
| 2004/0165100 A1 * | 8/2004 | Motta | 348/362 |

FOREIGN PATENT DOCUMENTS

WO      WO 02/44790 A      6/2002

* cited by examiner

| PIN NUMBER | SIGNAL NAME | I/O | COMMENTS |
|---|---|---|---|
| 1 | GND | PWR | GROUND |
| 2 | PCLK | O | PIXEL CLOCK |
| 3 | GND | PWR | GROUND |
| 4 | HREF | O | HORIZONTAL PIXEL VALID CLOCK (SYNC) |
| 5 | VCC_MOTOR | PWR | FOCUS CONTROL MOTOR POWER |
| 6 | VCC_ILLUM | PWR | ILLUMINATION POWER |
| 7 | REG_RESET* | I/O | I2C REGISTER RESET |
| 8 | VCC | PWR | CCD/AIMING POWER |
| 9 | VCC | PWR | CCD/AIMING POWER |
| 10 | EXSFT | I | EXTERNAL FRAME SYNC. |
| 11 | ILLUM_ENB* | I | ILLUMINATION POWER |
| 12 | AIM_ENB* | I | AIM ENABLE |
| 13 | PIX_D0 | O | PIXEL DATA BIT 0 |
| 14 | PIX_D1 | O | PIXEL DATA BIT 1 |
| 15 | PIX_D2 | O | PIXEL DATA BIT 2 |
| 16 | PIX_D3 | O | PIXEL DATA BIT 3 |
| 17 | PIX_D4 | O | PIXEL DATA BIT 4 |
| 18 | PIX_D5 | O | PIXEL DATA BIT 5 |
| 19 | PIX_D6 | O | PIXEL DATA BIT 6 |
| 20 | PIX_D7 | O | PIXEL DATA BIT 7 |
| 21 | FOCUS_CTRL1 | I | FOCUS CONTROL LINE 1 |
| 22 | VREF | O | VERTICAL FRAME VALID CLOCK (SYNC) |
| 23 | EXHT | I | EXTERNAL HORIZONTAL CLOCK |
| 24 | I2C_SDA | I/O | I2C DATA |
| 25 | I2C_SCL | I | I2C CLOCK |
| 26 | GND | PWR | GROUND |
| 27 | MCKI | I | MASTER CLOCK |
| 28 | GND | PWR | GROUND |
| 29 | FOCUS_CTRL2 | I | FOCUS CONTROL LINE 2 |
| 30 | CS* | I | CHIP SELECT |
| 31 | FRAME_SHIFT | O | FRAME SHIFT AFTER EXPOSURE FOR MODE 1 |

FIG. 4

INTERFACE FOR INTERFACING AN IMAGING ENGINE TO AN OPTICAL CODE READER

PRIORITY

This application is a continuation-in-part application of co-pending U.S. patent application Ser. No. 10/459,935, filed on Jun. 12, 2003, which claims priority to two U.S. Provisional Applications filed on Feb. 13, 2003 and Apr. 4, 2003 and assigned U.S. Provisional Application Ser. Nos. 60/447,093 and 60/460,370, respectively, the contents of which are incorporated by reference herein.

BACKGROUND OF THE INVENTION

1. Field of the Invention

This invention relates to imaging in optical code reading devices. Aspects of the invention are particularly useful in solid state, area image sensor based, handheld code readers which are positioned at variable orientations and distances with respect to a target code.

2. Description of the Related Art

Optical codes are patterns made up of image areas having different light reflective or light emissive properties, which are typically assembled in accordance with a priori rules. The term "barcode" is typically used to describe certain kinds of optical codes. The optical properties and patterns of optical codes are selected to distinguish them in appearance from the background environments in which they are used. Devices for identifying or extracting data from optical codes are sometimes referred to as "optical code readers" of which barcode scanners are one type.

Optical code readers are used in both fixed and portable installations in many diverse environments such as in stores for check-out services, in manufacturing locations for work flow and inventory control and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. Frequently, the optical code reader includes a handheld sensor which is manually directed at a target code.

Most conventional optical scanning systems are designed to read one-dimensional barcode symbols. The barcode is a pattern of variable-width rectangular bars separated by fixed or variable width spaces. The bars and spaces have different light reflecting characteristics. One example of a one dimensional barcode is the UPC/EAN code used to identify, for example, product inventory. An example of a two-dimensional or stacked barcode is the PDF417 barcode. Another conventional optical code is known as "MaxiCode". It consists of a central finder pattern or bull's eye center and a grid of hexagons surrounding the central finder.

It is noted that the aspects of the inventions disclosed herein are applicable to optical code readers, in general, without regard to the particular type of optical codes which they are adapted to read. The invention described may also be applicable to some associated image recognition or analysis.

Most conventional scanning systems generate one or more beams of laser light which reflects off a barcode symbol and back to the scanning system. The system obtains a continuous analog waveform corresponding to the light reflected by the code along one or more scan lines of the system. The system then decodes the waveform to extract information from the barcode. A system of this general type is disclosed, for example, in U.S. Pat. No. 4,251,798, assigned to Symbol Technologies, Inc. A beam scanning system for detecting and decoding one and two dimensional barcodes is disclosed in U.S. Pat. No. 5,561,283, also assigned to Symbol Technologies, Inc.

Such scanning systems are deployed in handheld units which may be manually pointed at the target. Often an individual scanner is a component of a much larger system including other scanners, computers, cabling, data terminals, etc. Such systems are frequently designed and constructed on the basis of mechanical and optical specifications for the scanning engine, sometimes called "form factors". One such form factor is the SE1200 form factor designed by Symbol Technologies, Inc.

Optical codes can also be read by employing optical code readers having an imaging engine. An imaging engine includes an image sensor having a two-dimensional array of cells or photo sensors, such as an area charge coupled device (CCD), which correspond to image elements or pixels in a field of view of the imaging engine. The imaging engine further includes a lens assembly for focusing light incident on the image sensor and associated circuitry coupled to the image sensor.

The associated circuitry produces electronic signals corresponding to a two-dimensional array of pixel information for the field of view. The electrical signals are processed by a processor for extracting information indicative of the focus quality of an image corresponding to the field of view.

The ability to focus a scanner quickly and accurately is critical to the success of the scanner. Proposed solutions to this problem include prepackaged components such as piezo ceramic actuators and micro motors. Each of these proposed solutions yielded limited success. Accordingly, an object of the present invention is to provide an imaging engine for an optical code reading device which provides more accurate and faster focusing of the imaging optics. Moreover, the imaging engine is dimensioned and configured to fit within a predetermined form factor, such as the SE900 and SE1200 form factors which are utilized in currently deployed optical code readers, such as optical code readers available from Symbol Technologies, Inc., to increase the reliability, versatility and focusing ability of such readers.

SUMMARY OF THE INVENTION

In accordance with the present invention, an optical code reader system having an improved imaging engine is provided. The optical code reader system includes an imaging engine which is configured to achieve an 85 micron, sub 20 milli-second, two position focus of an optical imaging system for the purpose of increasing working range without compromising scanning aggressiveness in a Proton sized barcode scan engine.

In accordance with an embodiment of the present invention, the optical code reader system includes a chassis; an imaging optics assembly pivotally mounted on the chassis; and means for moving the imaging optics assembly, wherein the means for changing the focus of the imaging optics assembly causes the imaging optics assembly to translate via rotational motion to one of two prescribed positions. The optical code reader may include other items such as an illumination device for illuminating the target image or an aiming device for assisting a user in aiming the optical code reader on the target image.

In accordance with an embodiment of the present invention, the means for changing the focus of the imaging optics assembly includes a motor assembly which includes a magnet, a coil assembly for applying an electromagnetic force on the magnet, an opto-mechanical barrel assembly for housing the imaging optics assembly and a pivot pin for rotatably connecting the opto-mechanical barrel assembly to the chassis. A signal is transmitted to the coil assembly such that the coil assembly applies an electromagnetic force on the magnet. The magnet is connected to the opto-mechanical barrel assembly thereby causing the opto-mechanical barrel assembly to pivot about the pivot pin to adjust the focus of the optical code reader.

In accordance with the present invention, an interface assembly is provided for interfacing an imaging engine having an adjustable lens assembly to a circuitry assembly of an optical code reader system. The interface assembly includes a first coupling circuitry assembly for transmission of at least one input signal in a first direction from the circuitry assembly toward the imaging engine, the at least one input signal including at least one focus control signal for controlling the lens assembly for selecting a focus position of at least two focus positions. The interface assembly further includes a second coupling circuitry assembly for transmission of at least one output signal in a second direction from the imaging engine toward the circuitry assembly, the at least one output signal including at least one pixel data signal, wherein the at least one pixel data signal is indicative of light sensed by a photo sensor array of the imaging engine.

In another embodiment of the invention, the interface assembly includes interface assembly including coupling circuitry including first coupling circuitry for transmitting at least one external vertical frame clock signal in a first direction from the circuitry assembly toward the imaging engine; second coupling circuitry for transmitting at least one horizontal pixel valid clock signal in a second direction from the imaging engine toward the circuitry assembly; third coupling circuitry for transmitting in the first direction at least one master clock signal; fourth coupling circuitry for transmitting in the second direction a plurality of bits of pixel data indicative of light sensed by a photo sensor array of the imaging engine; and fifth coupling circuitry for transmitting in the first direction at least one focus control signal for controlling the lens assembly for selecting the focus position.

In another embodiment of the invention, the interface assembly includes a connector having at least a first and second end, one of the of the first and second ends including a plurality of contacts including a first through a thirty-first contact for transmitting at least one signal. The interface assembly further includes first coupling circuitry for transmitting at least one focus control signal in a first direction from the circuitry assembly toward the imaging engine for controlling the lens assembly for selecting a focus position of at least two focus positions of the lens assembly, the first coupling circuitry including four contacts of the plurality of contacts; second coupling circuitry for transmitting at least one of at least one illumination enable signal in the first direction for controlling an illumination assembly of the optical code reader system and at least one aim enable signal in the first direction for controlling an aiming assembly of the optical code reader system, the second coupling including at least two of the contacts of the plurality of contacts; and third coupling circuitry for transmitting a plurality of bits of pixel data indicative of light sensed by a photo sensor array of the imaging engine in a second direction from the imaging engine toward the circuitry assembly, the third coupling circuitry including eight contacts of the plurality of contacts; wherein each of the contacts included in the first through the third coupling circuitry are different contacts.

In another embodiment of the invention, the interface assembly includes at least one of an input/output (I/O) means of the imaging engine, an I/O means of the circuit assembly, and a transmission assembly connected between the imaging engine and the circuitry assembly configured for transmitting at least one signal from one of the imaging engine and the circuitry assembly toward the other of the imaging engine and the circuitry assembly. The at least one signal includes at least one pixel data signal indicative of light sensed by a photo sensor array of the imaging engine; at least one clock signal for synchronization of the imaging engine and circuitry assembly; at least one reference signal including at least one vertical frame reference signal and at least one horizontal pixel reference signal; and at least one focus control signal for controlling adjustment of the lens assembly; and at least one ground signal.

In another embodiment of the present invention, a method is provided for interfacing an imaging engine removably positioned within an optical code reader to a circuitry assembly of an optical code reader system. The method includes the steps of transmitting at least one focus control signal in a first direction from the circuitry assembly toward the imaging engine for controlling a lens assembly of the imaging engine for selecting a focus position of at least two focus positions, and transmitting at least one pixel data signal indicative of light sensed by a photo sensor array of the imaging engine in a second direction from the imaging engine toward the circuitry assembly.

The imaging engine is preferably dimensioned and configured to be removably positioned and fit within a predetermined form factor, such as the SE900 and SE1200 form factors which are utilized in optical code readers, for example, optical code readers available from Symbol Technologies, Inc. The imaging engine will increase the reliability and versatility of such optical code readers.

Preferably, the imaging engine is optimized to provide high resolution images by having a high resolution photo detector array or image sensor. The imaging engine may be provided with an aiming and/or illumination assembly as known in the art.

It is provided that the imaging engine having the interface characterized by the particular specifications in accordance with the present invention can be incorporated within or added to devices other than optical code readers, such as personal digital assistants (PDAs) and other mobile computing devices, a digital camera, a pager, a video telephone, and a cellular telephone. Accordingly, the above and other embodiments of the invention will be described hereinbelow with reference to the accompanying figures.

BRIEF DESCRIPTION OF THE DRAWINGS

Various embodiments of the invention will be described herein below with reference to the figures wherein:

FIG. 4 is a table of an exemplary configuration for pin connections of a data signal processor of the imaging engine;

DETAILED DESCRIPTION OF THE PREFERRED EMBODIMENTS

Figure 1:
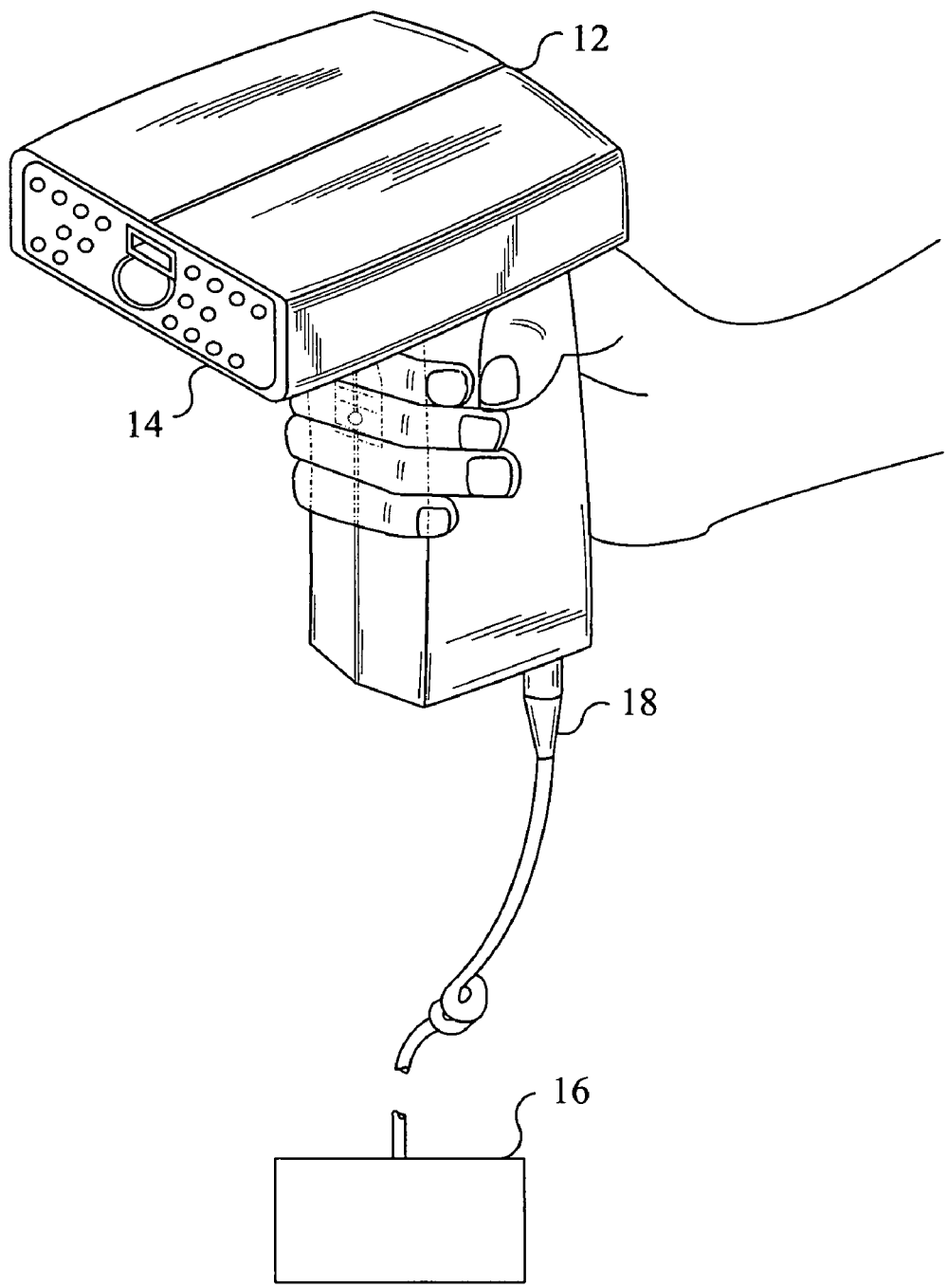
FIG. 1 is a perspective view of an optical code reader system having an optical code reader equipped with an imaging engine having an interface characterized by particular specifications in accordance with one embodiment of the present invention.

Reference is now made in specific detail to the drawings in which like reference numerals identify similar or identical elements throughout the several views.

Figure 2:
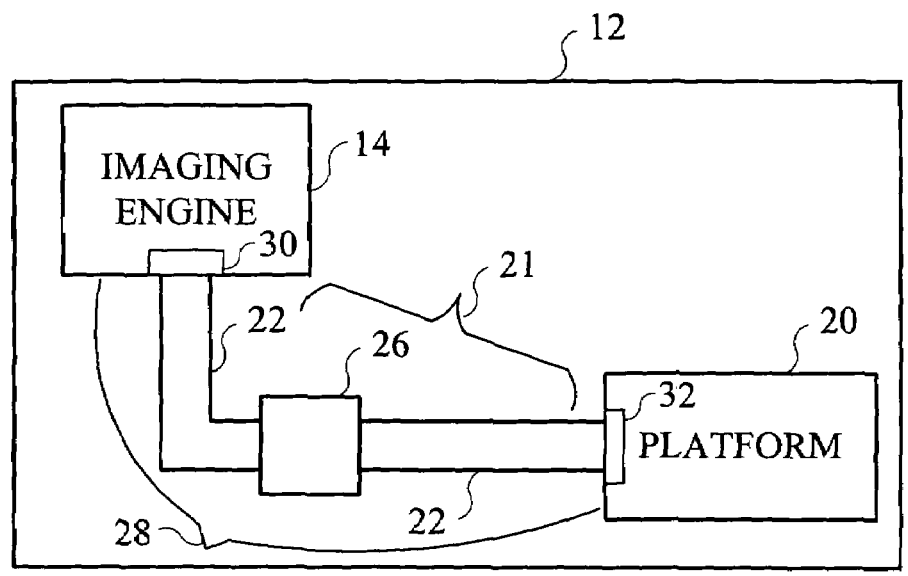
FIG. 2 is a block diagram of the optical code reader depicted in FIG. 1.

FIG. 1 shows an optical code reader system 10 including an optical code reader 12 having an imaging engine 14, where the optical code reader 12 is preferably connected to a host terminal 16 via a cable 18. FIG. 2 shows a block diagram of the optical code reader 12, in which the imaging engine 14 is interfaced to a platform 20. Transmission assembly 21 is provided including at least one connector 22 and/or at least one transmission adaptation device 26 having individually or collectively electrical/and or data transmission circuitry for providing electrical and/or data communication between the imaging engine 14 and the platform 20.

An interface assembly 28, for providing data and/or electrical communication between the imaging engine 14 and the platform 20, includes an input/output (I/O) means 30, such as an I/O port, of the imaging engine 14 configured for exchanging at least one signal with the platform 20, including direct and indirect exchange of the at least one signal; an I/O means 32, such as an I/O port, of platform 20 configured for exchanging the at least one signal with the imaging engine 14, including direct and indirect exchange of the at least one signal; and the transmission assembly 21, directly or indirectly connected between the imaging engine 14 and the platform 20, for transmitting the at least one signal between the imaging engine 14 and the platform 20.

Preferably, the at least one signal includes a plurality of pixel signals corresponding to sensing of an image by the imaging engine 14, at least one focus control signal for controlling focus distance of the imaging engine 14, reference signals for exchanging imaging reference information, synchronization signals, power signals and ground signals. In a preferred embodiment the at least one signal includes a combination of at least one illumination control signal for controlling illumination generated by the imaging engine, at least one aiming signal for controlling aiming by the imaging engine, at least one programmable register signal exchanged with programmable registers in a data signal processor of the imaging engine, at least one chip select signal and at least one frame shift signal.

In another embodiment, the transmission assembly 21 further includes interception circuitry for intercepting a signal of the at least one signal from reaching a destination that it is transmitted toward selected from the group consisting of the imaging engine and the circuitry assembly.

The reader 12 may be a unit integrated into a stationary fixture, such as a checkout counter, a doorway molding, a toll booth, a station on a conveyor belt, etc., or a mobile unit, such as a handheld reader or a rotating turret. Furthermore, the reader 12 may be attached to or integrated with a portable, handheld computer device, such as a PDA and handheld computer devices available from Symbol Technologies, Inc., such as the PDT 6800 Series and the PDT 8100 Series Portable Data Terminals, or attached to or integrated with portable scanning systems or terminals, such as those available from Symbol Technologies, Inc. Such systems may be incorporated as part of a local area, cellular or wide area network to coordinate scanning and other image processing functions described below. Furthermore, the reader 12 may include video control circuitry and frame grabbing circuitry for outputting video signals for displaying images on a terminal monitor. The reader 12 may further include a data compression module (not shown) for compressing image data, such as for storage within the reader 12 and/or host terminal 16. In addition, the imaging engine 14 may be integrated into a video phone system for sharing use of display, processing and I/O capabilities.

In circumstances where the reader 12 is to be retrofitted from a laser line scan engine to an imaging engine 14, the imaging engine 14, and associated circuitry (not shown) can be inserted in place of the line scan engine and circuit board. In this way, previously designed toolings, housings and host devices may be employed and provide continuity in upgrading the code reading system. In preferred embodiments, the imaging engine 14 is less than two cubic inches in volume and is dimensioned to replace a moving laser beam scanning engine in a handheld optical code scanner, such as an SE1200 form factor scanning engine. The reader 12 may further be provided as an optical code reading kit in which more than one imaging engine is provided, and an installed imaging engine is replaceable with a different imaging engine that is better suited for a particular application.

Cable 18 may provide data communication between the reader 12 and the host terminal 16 and/or electric communication for providing electrical power to the reader 12. For example, electrical power may be provided to the reader 12 via the host terminal 16 and cable 18, or alternatively by a rechargeable battery within the reader 12. The cable 18 may be partially or fully replaced by wireless communication means such as radio frequency, optical or cellular communication means. For example, the reader 12 may include a radio frequency board and an antenna which provide a mobile radio link to one or more data terminals, such as the host terminal 16. An infrared data interface (IRDA) or multi-contact shoe may also be provided to communicate data between the reader 12 and an external receiver or docking device, respectively. Compressed tag and/or image data may be transmitted to the host terminal 16 via a radio frequency link, IR communication link, or direct contact with the docking device.

Image data generated by the imaging engine 14 are processed by the reader 12 (as described further below) and/or by the host terminal 16. The host terminal 16 includes or accesses at least one processor, where the at least one processor may be connected to one or more peripherals or computing devices, such as a video monitor, and/or a network. It is contemplated that the reader 12 may operate as a standalone device, without being connected to host terminal 16 or other processor.

The reader 12 is capable of being aimed at an optical code, where the optical code is brought into the field of view of the reader 12 by moving at least one of the optical code and/or the reader 12. Upon actuation, the imaging engine 14 images the optical code within its field of view and generates corresponding image data. A series of optical codes, such as a series of objects on an assembly line each having an affixed code, or a printout of a series of codes, may be provided to the reader 12 for sequential imaging of individual optical codes of the series of optical codes by the reader 12.

Figure 3:
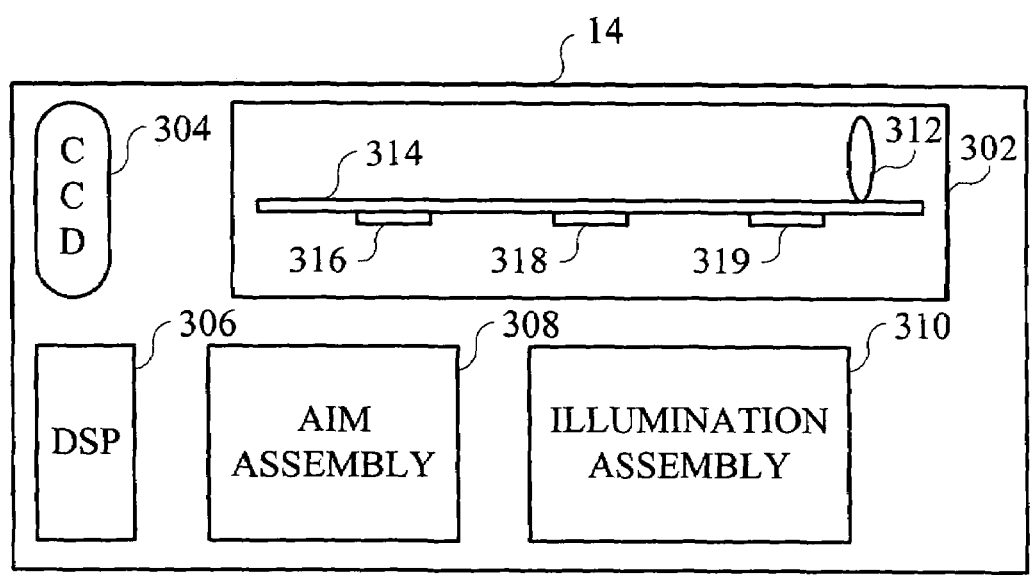
FIG. 3 is a block diagram of the imaging engine depicted by FIG. 1.

The imaging engine 14, as shown in greater detail in FIG. 3, preferably further includes a lens assembly 302; a photo sensor array 304, such as a charge-coupled device (CCD); and a data signal processor (DSP) 306. In a preferred embodiment the imaging engine 14 further includes an aiming system 308 and/or an illumination system 310. Furthermore, in a preferred embodiment, the lens assembly 302 includes at least one lens 312 for focusing light incident on the photo sensor array 304, where positioning of the lens assembly 302 is adjustable for adjusting focus distance of the lens assembly 302. In the example shown, the lens assembly 302 is mounted on a lens guidance assembly 314, and having a lens adjustment mechanism 316 having a motor 318 responsive to a focus control unit 319 for moving at least one lens of the lens assembly 302 along the lens guidance assembly 314 for changing the focus distance of the lens assembly 302. Accordingly, the imaging engine 14 has the ability to change focus positions for extended working range or for better-focused picture taking capability in applications where the user needs to read high-density barcodes and/or take digital pictures.

The DSP 306 includes a data signal processor such as a DSP which includes a multi-chip module (MCM) having at least one charge pump 332 and a timing generator 334 needed to drive the CCD. Preferably, further included within the MCM is a correlated double sampler (not shown) and an A/D converter (not shown) for converting analog voltage output by the CCD into multi-bit (e.g., 8-bit) quantized pixels representing one of a plurality of shades of gray, preferably 256 or more shades of gray.

Preferably, the imaging engine 14 may be configured to operate in a variety of resolution modes, including a high precision mode used for applications in which the reader is used for reading bar codes. Preferably, the high precision mode provides a capability for precise setting of exposure times and faster startup from the power on condition resulting in more aggressive performance.

Platform 20, which may be included within the optical code reader 12 or within the host terminal 16, includes a microprocessor and may further include glue logic, e.g., a customized Application-Specific Integrated Circuit (ASIC), where necessary for interfacing the microprocessor to the transmission assembly 21. The microprocessor is preferably a commercially available microprocessor. In one embodiment, the platform includes a microprocessor configured in accordance with XSCALE architecture, e.g., an Intel PXA250 processor, and a customized Application-Specific Integrated Circuit (ASIC). In another embodiment, the platform includes a microprocessor that potentially does not need glue logic for connecting to the transmission assembly 21, e.g., a Motorola MX-1 processor.

The at least one connector 22 is preferably a commercially available electrical connector for coupling two devices for electrical or data communication. The at least one connector 22 may be elongated, such as including cables, such as flat flexible cables, for connecting the two devices when they are located a distance from one another. In the example provided, the at least one connector 22 includes a 31 position, 0.3 mm flex connector manufactured by Molex Inc. It is envisioned that the at least one connector 22 is a connector for non-electrical transmissions, such as optical transmissions.

The at least one transmission adaptation device 26 is a device, such as an adaptor, for adapting an electrical and/or data transmission. The at least one transmission adaptation device 26 may adapt the transmission such as by modifying transmission of one or more signals of the at least one signal, including modifying a characteristic of the at least one signal and/or the path traveled by the signal. For example, the at least one transmission adaptation device 26 may modify a characteristic, such as by combining one or more signals of the at least one signal into one signal, generating one or more signals from one signal of the at least one signal, and/or changing the configuration of the signal, such as performing a conversion on the signal, for example between electrical, optical, RF, etc. For another example, the at least one transmission adaptation device 26 may modify a path, such as by directing a signal of the at least one signal from a contact, such as a pin, of one connector or input/output means to a contact, such as a pin, of another connector or input/output means. Alternatively, the transmission adaptation device 26 may terminate a path along which the at least one signal is propagated. It is envisioned that the at least one connector 22 and/or the at least one transmission adaptation device 26 include a combination of wired and wireless data transmission means, including means for converting the transmission between wired and wireless transmission modes, such as optical, RF, etc.

FIG. 4 shows an exemplary configuration for pin connections of the DSP 306 provided at I/O means 30 for connecting to platform 20 via transmission assembly 21, preferably when the imaging engine 14 is configured to operate in the high precision resolution mode. It is contemplated that different configurations for pin connections may be used when the imaging engine 14 is configured to operate in other resolution modes.

Preferably, the location L1 for pin one P1 of the DSP 306 is positioned on a side S1 of the imaging engine 14 opposite the aiming and illumination assemblies 308, 310, respectively. Preferably, the operating voltage provided is between 3.10v and 3.45v. It is contemplated that the signals listed in FIG. 4 be respectively assigned to different pins. Preferably, the VCC line is filtered, such as via LC filtering, to minimize digital noise from the terminal from getting into the camera analog chain. Preferably, the FRAME_SHIFT pin is left unconnected, as it is for use in future systems configured to operate in a resolution mode other than the high precision resolution mode. However, when operating in the resolution mode in which the I/O is available and FRAME_SHIFT is connected, it is preferable to connect the FRAME_SHIFT pin to an input of the platform 20. The FRAME_SHIFT pin is preferably connected to the UV6 pin of the LC99704 DSP which corresponds to address 216d bit 6.

The REG_RESET* pin resets I²C registers in the LC99704 DSP when it is made low, and therefore it is preferable that circuitry be included in the imaging engine 14 to ensure that the REG_RESET* pin gets a valid reset at power up. The REG_RESET* pin may be connected to an open drain output of the platform 20 so that the I²C registers can be software reset via a hardware line. In an embodiment in which a customized ASIC is included in the platform 20, CS* pin is connected to ground, since when the CS* pin is driven high, pixel data bits become high-Z, which is not needed in applications using the customized ASIC implementation. The FOCUS_CTRL1 and FOCUS_CTRL2 pins are used to enable various modes of focus selection, where enablement of the modes for focus selection does not require real-time modification of signals at the FOCUS_CTRL1 and FOCUS_CTRL2 pins during image acquisition. Accordingly, it is preferable to connect the FOCUS_CTRL1 and FOCUS_CTRL2 pins to a general purpose input/output pin or port of the platform 20 for modification of focus selection on a scan session basis.

Figure 5:
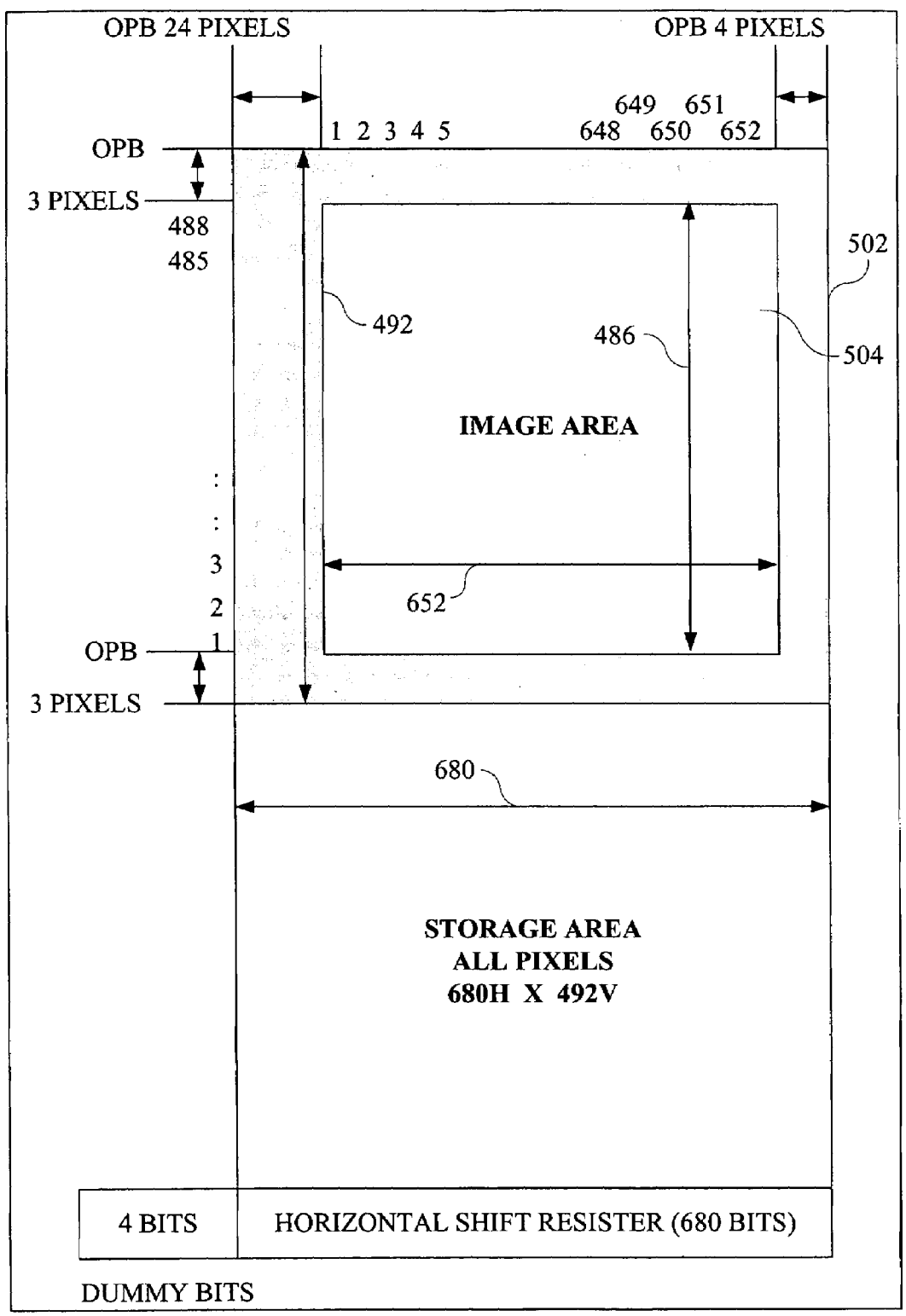
FIG. 5 is pixel layout 400 for a photo sensor array of the imaging engine depicted in FIG. 3.

FIG. 5 shows pixel layout 500 for the exemplary LC00214 CCD. The pixel area 502 is composed of 680 horizontal pixels and 492 vertical pixels. The actual or effective pixels upon which light is gathered is a slightly smaller image area 504 of 652 H by 486V pixels, where optically black pixels (OPBs) are pixels that are not photosensitive. When the photo sensor array 304 is read-out during image capture all of the pixels are captured unless the image cropping features of the DSP 306 are configured through the I$^2$C interface.

Preferably, a clock supplied by the platform has a nominal frequency of 47.923 MHz. The platform 20 divides down this clock to generate a master clock input (MCKI) to the imaging engine 14. Preferably, the exemplary platform clock of 47.923 MHz is divided down by four to 11.981 MHz for generating the MCKI. The exemplary LC00214 CCD needs a clock near 24 MHz to operate properly. Accordingly, an internal PLL of the DSP 306 is used to multiply the incoming MCKI by two to obtain an internal camera (i.e., imaging engine) clock of 23.962 MHz, known as the camera's master clock (MCK). During read out of the pixel area, each pixel is converted to an 8-bit digital value in the current example at a rate equal to one half the MCK. So preferably a pixel clock, PCLK, has a frequency of $$\frac{23.962 \text{ MHz}}{2} = 11.981 \text{ MHz}.$$

In a preferred embodiment the camera is configured such that there are 763 PCLK periods per line of pixels read out, this means that the total time to read one line out from the photo sensor array 304, otherwise known as the horizontal period, is $$= \frac{763}{11.981 \text{ MHz}} = 63.69 \text{ }\mu\text{s}$$

(a HREF/EXHT period), where HREF refers to a horizontal reference signal, and EXHT refers to an external horizontal trigger signal. Furthermore, in the preferred embodiment there are 525 line periods in an entire frame (image), which means that the total time to read out a fall frame from the photo sensor array 304, otherwise know as the vertical period, is =525×63.69 µs=33.43 ms. (an VREF/EXSFT period), where VREF refers to a vertical reference signal, and EXSFT refers to an external start of frame trigger signal. This yields a constant frame rate of $$\frac{1}{33.43 \text{ ms}} = 29.91$$

frames per second. Both the platform 20 and the DSP 306 need to be configured properly to obtain congruent clock settings, and preferably, appropriate default register settings are provided for ensuring that the LC99704 DSP 306 is configured properly.

Preferably, a power mode of a plurality of power modes (modes of power consumption) may be selected for the imaging engine 14, depending upon the state of the decoding application.

Each of these power modes offers a trade-off between power consumption and time to acquire an image, which ultimately impacts time to decode. Five exemplary operating power modes are:

A. Completely powered off by a hardware switch;
B. Host acquisition halted, camera placed in standby via I$^2$C settings;
C. Host acquisition halted, external camera sync signals halted (EXSFT & EXHT idle);
D. Host acquisition halted, camera run at full frame rate; and
E. Acquiring and running at full frame rate.

The charge pump 332, which generates a voltage, such as ±5 v, so that charge can be properly shifted out of the CCD sensor, takes time to come up to regulation. When in power modes A and B, the charge pump circuit is brought up to regulation as fast as possible (~60 ms) (the charge pump is already up to regulation in the remaining power modes). A startup sequence is preferably implemented to minimize this time.

In power mode A, the engine is completely powered off and must go through a power-on sequence which includes:
1. Programming the camera register settings via I$^2$C; and
2. Idling EXSFT to prime the charge pump.

The idling of EXSFT helps to get the charge pump voltage to regulation as fast as possible and is preferably performed by setting an image control sensor size (ICSS) register of the platform 20 appropriately.

Figure 6:
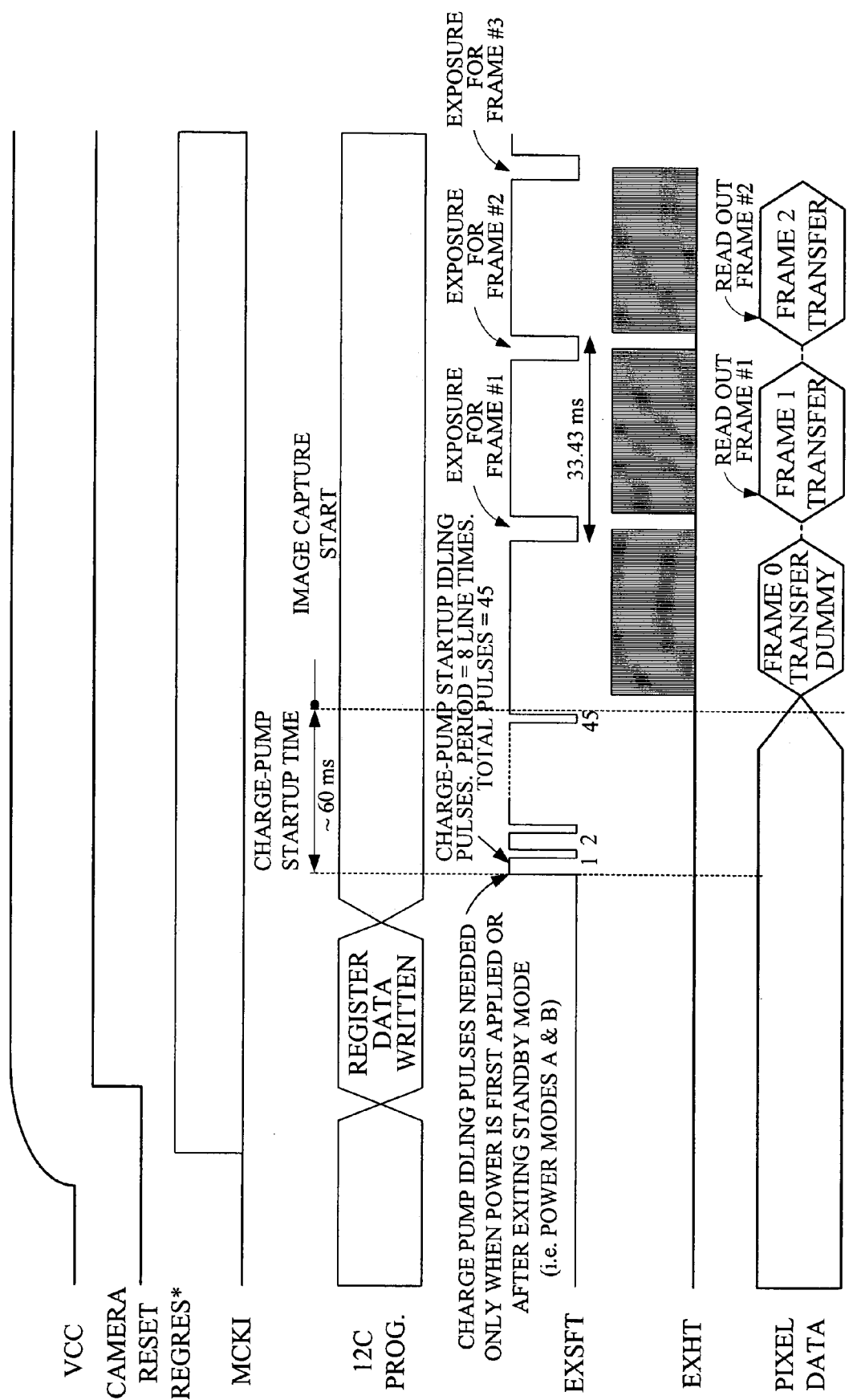
FIG. 6 is a timing diagram of a startup sequence of a data signal processor of the imaging engine depicted in FIG. 3.

FIG. 6 depicts the timing of the startup sequence of the imaging engine 14 after power is applied to the imaging engine 14 or after exiting the imaging engine's standby power mode B. The I$^2$C registers are written to in accordance with design requirements after power is applied.

An I$^2$C register writing sequence is performed when entering power mode B (standby) in accordance with design requirements. When exiting power mode B (standby), full programming of the I$^2$C registers is preferably not performed, since the register contents are not lost by going into standby power mode B. To exit standby power mode B the following sequence is preferably followed:
1. Exit standby power mode B via I$^2$C register writing;
2. Idling of EXSFT to prime charge pump; and
3. Initialization of the motor focus control.

When exiting standby power mode B an I$^2$C register writing sequence is performed in accordance with design requirements. Once standby power mode B is exited, the charge pump startup sequence shown in FIG. 6 is preferably followed.

Preferably, the lens guidance assembly 314 of the imaging engine 14 is capable of being set to one of two different predetermined focus positions that are set at the time of manufacture. One focus position, called the near focus, allows the imaging engine 14 to focus on objects that are about five inches (12.7 cm) away. The second focus position, called the far focus, allows the imaging engine 14 to focus on objects that are about nine inches (22.9 cm) away. The superset of these two focus positions provides the imaging engine 14 with the capability to achieve excellent working range across a range of bar code densities, and further provides for improved distance picture taking capability when set to the far focus position. The focus control unit 319 is controlled by the FOCUS_CTRL1 and FOCUS_CNTRL2 signals for controlling operation of the motor 318 for positioning the lens assembly 302. Control of positioning the lens assembly 302 is shown in Table 1.

TABLE 1

Focus control definitions

| FOCUS_CTRL1 | FOCUS_CTRL2 | Operation | Comments |
|---|---|---|---|
| 0 | 0 | Motor 318 completely OFF | Motor 318 not operated and lens assembly 302 not held in either position. |
| 0 | 1 | Far Focus Position Selected | Motor 318 operated to force lens assembly 302 into far position |
| 1 | 0 | Near Focus Position Selected | Motor 318 operated to force lens assembly 302 into near position |
| 1 | 1 | Toggle Mode | Motor 318 operated to change lens assembly position between near and far positions on each rising edge of EXSFT. |

Typically the motor 318 will be run in toggle mode during barcode decode scan sessions so that the focus changes between near and far focus with each acquired frame. In certain situations, such as picture taking and specific barcode reading applications, it may be desirable to force one of the focus positions over multiple frame captures. Once commanded to operate, the motor 318 will operate the lens adjustment mechanism 216 for moving the at least one lens 312 along the lens guidance assembly 314 to the designated position and settling there within 20 ms of time. This means that the maximum exposure time is roughly a frame time minus the 20 ms settle time, resulting in a maximum exposure setting of 12 ms. The software should not set the exposure time to be larger than 12 ms when operating in toggle mode to ensure proper and stable image capture. If a focus position is forced to near or far, the exposure time can be made as large as a frame time without issue as long as the motor is given 20 ms to settle from the time the focus position is forced to the time the first image exposure begins.

There may be a need under certain conditions to know the focus position of a captured image when toggle mode is enabled. In the example provided there is no direct feedback from the imaging engine 14 as to the focus position that the lens assembly 302 is in while an image is being read out. The only way to know the focus position is to initialize the imaging engine 14 to a particular focus position and then keep track of the current focus position on a frame-by-frame basis. One way to accomplish this task is to force the focus position to a particular focus position using FOCUS_CTRL1 and FOCUS_CTRL2, then change the focus control to toggle mode, and command the platform 20 to enable the EXSFT signal (e.g., in the platform, setting a RUN bit (assuming the ACQ bit is already enabled)). On every rising edge of EXSFT the camera focus will toggle, so the first frame will be captured in the focus position opposite to the initialized position. The next frame will be at the initialized position and so on. As each of these frames are captured an end of frame interrupt is generated by the platform 20, and the frame can be tagged with its focus position while the current focus position is toggled to the next position in preparation for capturing the next frame. Preferably, when using any of power modes A–E, an initial focus position is set to ensure that the first frame always starts in a predetermined focus position.

Operating the platform 20 in power mode D, in which running is enabled for enabling the imaging engine 14 to sense images, but acquiring of images is disabled (in the platform 20, a RUN bit (run) is enabled and an ACQ bit (acquire) is disabled), may be used, for example, in the middle of a scan session when two frames have been acquired and are being processed and the system continues to let the camera run without acquisition so that it can aggressively capture more frames if needed. In this situation, the processor will not generate an end of frame interrupt since it is not acquiring. Under this condition keeping track of the focus position state becomes more difficult. It is recommended that if power mode D is used, the motor should be forced to an initialized focus position until the acquiring (the ACQ bit) is enabled. This will guarantee that the focus control is re-initialized to a known starting position, and the end of frame interrupt can again be used to keep track of the focus position state. Default camera register settings to be written to DSP 306 of the imaging engine 14 (e.g., the LC99704) after power up are provided in accordance with design requirements.

Figure 7:
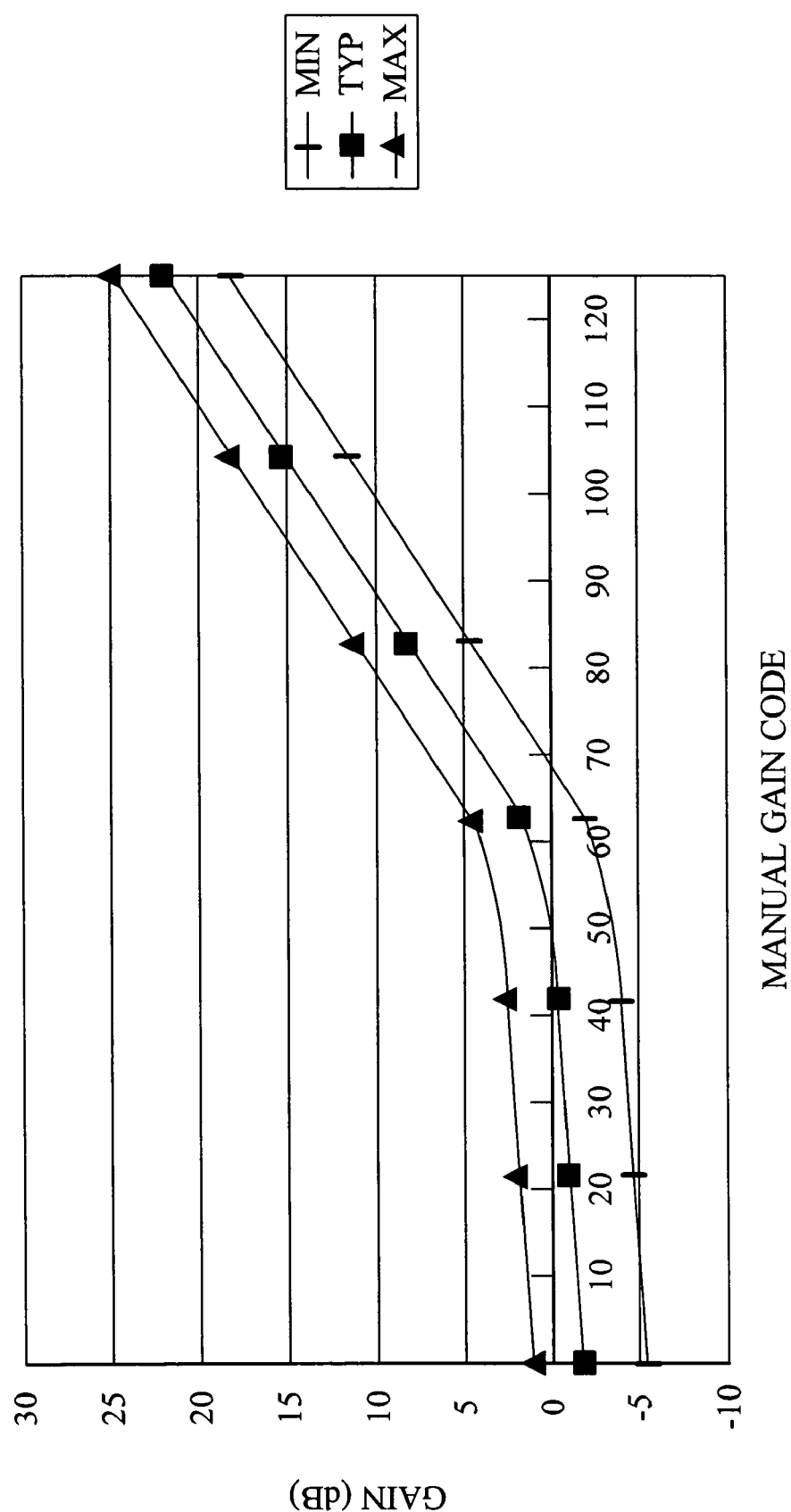
FIG. 7 is a plot of analog gain achieved in response to digital gain control entered via the data signal processor in accordance with the present invention.

Preferably, the imaging engine 14 includes both a digital and analog gain control that is capable of being manually varied over the $I^2C$ interface. Barcode reading applications typically do not make use of the digital gain control since it does not generally provide true signal amplification value. The analog gain is controlled via register 157*d* of the LC99704 DSP. FIG. 7 shows analog gains achieved in accordance with digital values written to register 157*d*. The analog gain takes effect on the subsequent frame read out.

The acquisition interface for the platform 20 is preferably highly programmable. Key items that need to be configured to ensure proper camera operation are: the setting of MCKI to be congruent with DSP 306 (11.981 MHz from the platform 20 in the example provided); polarity of EXSFT to match a startup sequence of the imaging engine 14 after power is applied to the imaging engine 14 or after exiting the imaging engine=3 s standby power mode B; the idle states of EXHT and EXSFT when acquisition/running are disabled; pixels per line and lines per frame are congruent with the CCD; and direct memory access (DMA) destination and reload address registers.

Figure 8:
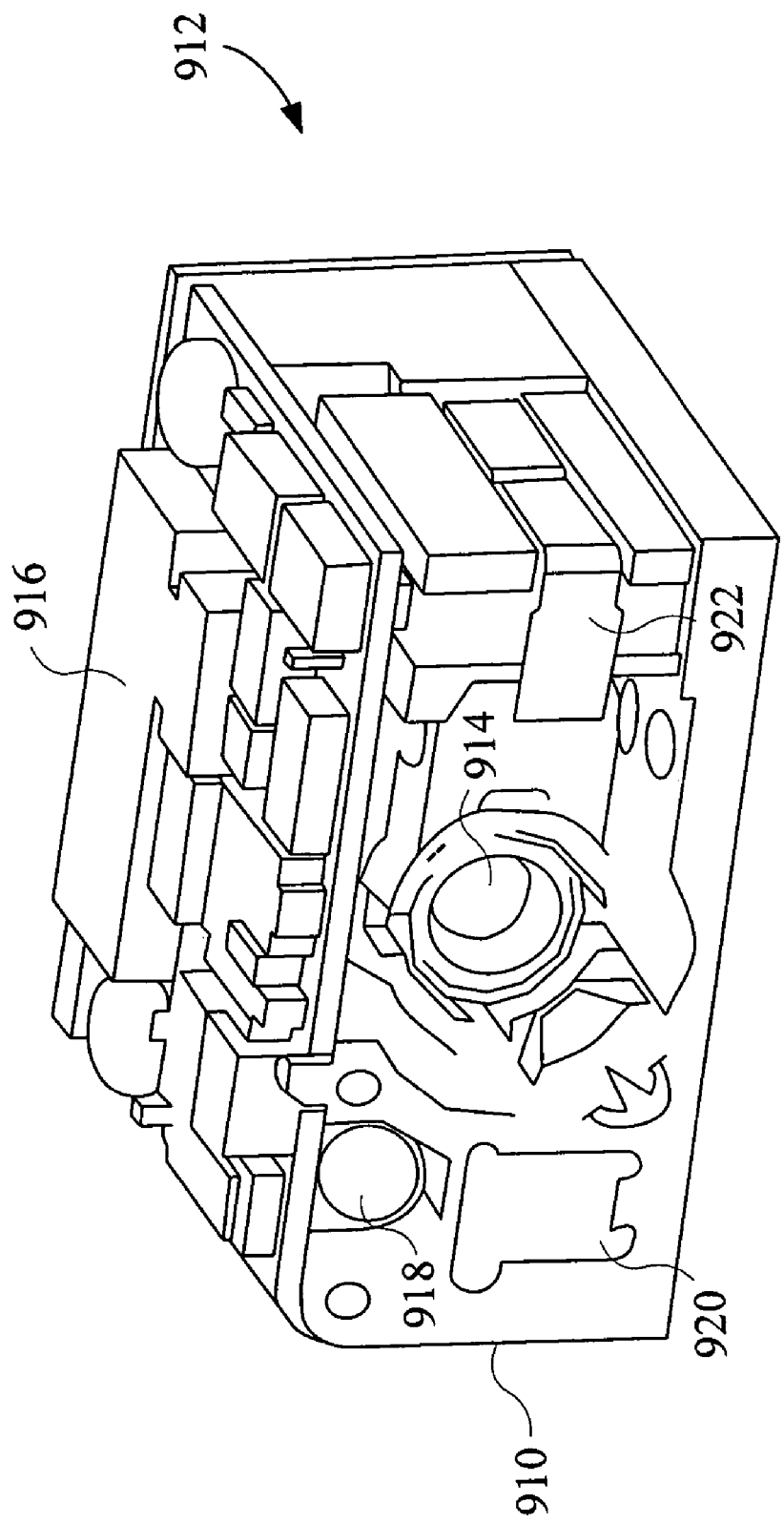
FIG. 8 is a perspective view of an assembled imager in accordance with the present invention.

Referring now to FIG. 8, an optical code reader 912 is illustrated in a perspective view, in accordance with an embodiment of the present invention. The optical code reader 912 includes imaging optics 914, a printed circuit board assembly 916, an illumination device 918, an aiming device 920, and a motor assembly 922. The imaging optics 914 generate image data which is received and processed by printed circuit board assembly 916. The illumination device 918 and aiming device 920 assist in ensuring that the imaging optics 914 has quality subject matter to acquire image data from. The motor assembly 922 represents the means for focusing the target image, as will be discussed in further detail herein. The components of the optical code reader 912 are housed within, or attached to, a chassis 910. The chassis 910 is preferably formed of zinc.

The illumination device 918 may consist of an illumination printed circuit board and a lenslet plate. The illumination printed circuit board may include a plurality of light emitting diodes. In a preferred embodiment, twenty 660 nm light emitting diodes (LED's) are arranged on the illuminator board. In an alternative embodiment, LED's producing a higher or lower wavelength light may be employed. In either case, the LED's are arranged in such a way that the target area is evenly illuminated. In systems where multiple fields of view and multiple focal lengths are selectable in the imaging engine, the illumination system may provide different fields of illumination. Light emanating from the LED's is projected through apertures or lenslets in a front plate of the imaging engine.

The illumination source may produce a relatively broad beam of lower output intensity to illuminate a target barcode relatively close to the imaging optical code reader, and a relatively narrower beam of higher output intensity to illuminate a target barcode relatively far from the reader. A portion of the illumination source for producing the lower output intensity illumination beam may comprise one or more light emitting elements with a wide divergence pattern located relatively near a principle optical axis of the lens assembly. Additional elements may be used to provide a longer range illumination beam of higher output intensity. In a preferred embodiment, this function is performed by light emitting elements with a narrow divergence pattern located relatively farther from a principle optical axis of the imaging engine. These latter elements may be plural light emitting diodes each associated with a focusing lenslet located in a front face of the imaging engine.

In an illumination system using plural light emitting elements, certain intensity variations may occur across the illuminated field. In preferred embodiments of the present invention, image processing circuits and/or software compensates signals from the image sensor for known variations in illumination provided by the illumination source.

As discussed above with reference to FIG. 3, it is preferred that the lens assembly of the imaging engine is capable of being set to one of two different predetermined focus positions. The positions are typically fixed at the time of manufacture. One focus position, called the near focus, allows the imaging engine to focus on objects that are about five inches (12.7 cm) away, for example. The second focus position, called the far focus, allows the imaging engine to focus on objects that are about nine inches (22.9 cm) away, for example. The superset, or overlap, of these two focus positions provides the imaging engine with the capability to achieve an excellent working range across a plurality of bar code densities, and further provides for improved distance picture taking capability when set to the far focus position.

Typical means for adjusting the focus positions in prior art optical code readers include moving the imaging optics along the optical axes. In accordance with an embodiment of the present invention, adjustments to the focus position are made by pivoting the imaging optics, as will be described with reference to FIGS. 8–10.

Figure 9:
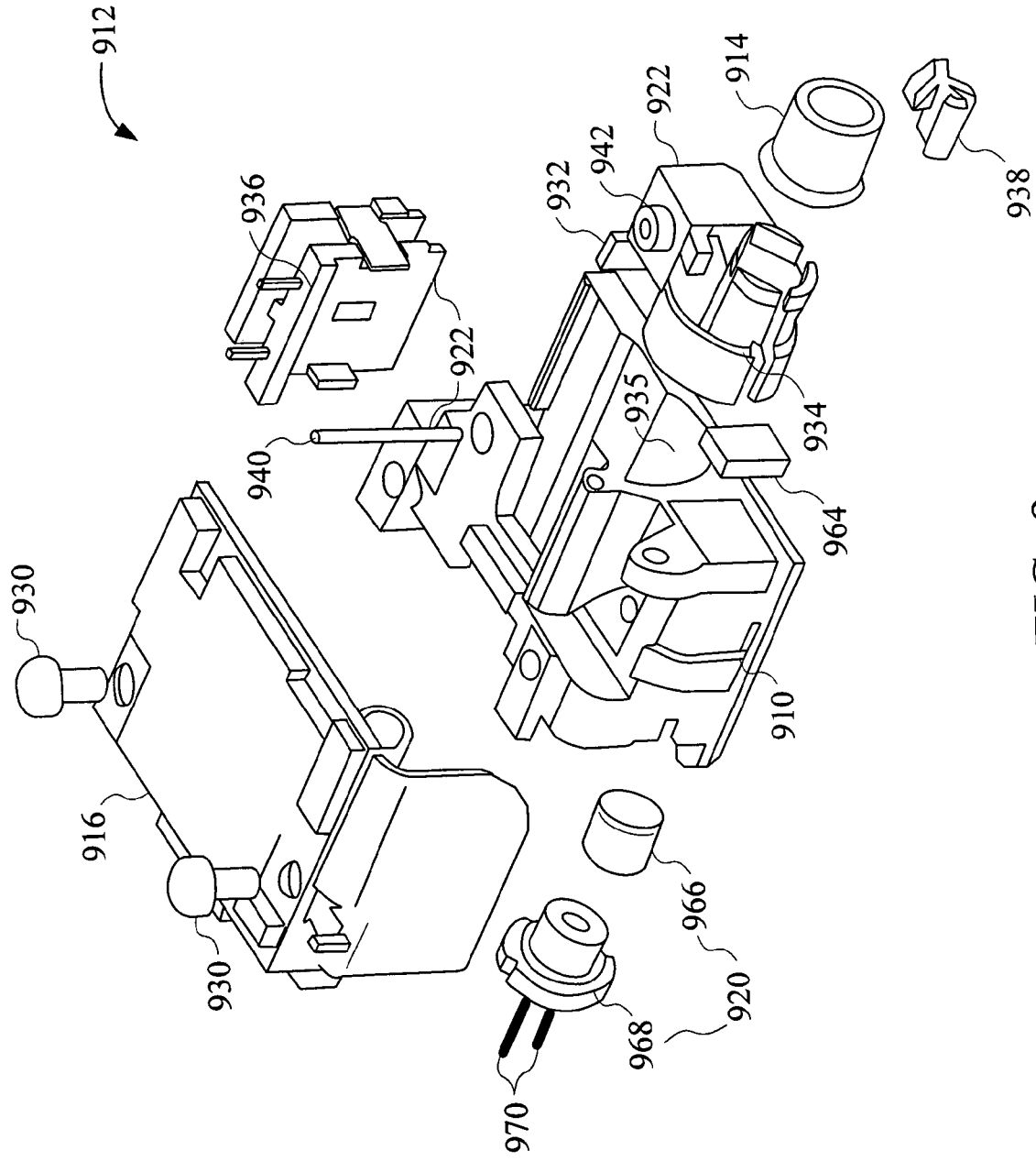
FIG. 9 is an exploded perspective view of an imager in accordance with the present invention.

Referring to FIG. 9, an exploded view of the optical code reader 912 illustrated in FIG. 8 is illustrated. Accordingly, FIG. 9 illustrates exploded views of the imaging optics 914, the PCB assembly 916, the aiming device 920 and the motor assembly 922.

Screws 930 are provided to secure the PCB assembly 916 to the chassis 910. Removal of the screws 930 permits the PCB assembly 916 to be removed from the chassis 910. Once the PCB assembly 916 is removed, a cavity 935 in chassis 910 which houses the motor assembly 922 may be accessed. The motor assembly 922 comprises a magnet 932, a rotating opto-mechanical barrel assembly 934, a coil assembly 936, a stop 938, and a pivot pin 940.

The aiming device 920 comprises a diffractive optical element 964, a diffractive optical element lens assembly 966 and a visual laser diode 968. The diffractive optical element 964 is mounted in a front face of the chassis 910 of optical code reader 912. The diffractive optical element lens assembly 966 is positioned behind the diffractive optical element 964. The visual laser diode 968 generates a laser light and is positioned behind and adjacent diffractive optical element lens assembly 966. The visual laser diode 968 is electrically connected to PCB assembly 916, via electrical connectors such as prongs 970.

Preferably, the motor assembly 922 is actuated after determining the distance between the imaging apparatus and the object to be imaged. A distance determining method which can be used to determine the distance between the imaging apparatus of the present invention and the object is disclosed in U.S. Pat. No. 6,340,114 B1 which is assigned to Symbol Technologies, Inc. The method involves using an aiming device of the imaging optical code reader to measure the distance to a target image. Other distance determining methods may be used for determining the distance between the imaging apparatus and the object to be imaged such as, for example, the methods disclosed in U.S. patent application Ser. No. 10/425,499, filed Apr. 29, 2003, which is incorporated by reference herein.

The determined distance to the object is then correlated by a processing system (e.g., PCB assembly 916) to a specific or approximate position of the imaging optics 914 with respect to a fixed reference point (e.g., a specific point of the imaging optics, such as the central point).

The processing system then determines the amount of distance the imaging optics need to be moved to be at the specific or approximate position of the imaging optics with respect to the fixed reference point. To perform this computation, the processing system takes into consideration the last stored position of the reference point of the imaging optics 914 with respect to the fixed, reference point. The last stored position of the reference point of the imaging optics 914, without taking into consideration the occasional need to calibrate the imaging apparatus by manually or automatically setting the current position of the imaging optics at a known position with respect to the fixed reference point equates to the current position of the reference point of the imaging optics 914 with respect to the fixed reference point.

The last "recorded" or current position is determined by the processing system by continuously calculating the amount of distance the reference point of the imaging optics 914 moves with respect to the fixed reference point. For example, after an initial manufacturing setting or calibration of the imaging apparatus, the reference point of the imaging optics 914 is located on the same plane as the fixed reference point, or at a known distance from the fixed reference point, e.g., the furthest possible position from the fixed reference point.

Thereafter, focus changes between near and far focus during barcode decode scan sessions are achieved in accordance with the following description. Initially, the focus quality is determined by information which is processed by PCB assembly 916, as described above. In accordance with the present disclosure, signals from the PCB assembly 916 are then transmitted to the coil assembly 936 which is positioned adjacent to the magnet 932. The coil assembly 936 applies an electromagnetic force to magnet 932. The magnet 932 moves as a function of the magnitude and direction of the electromagnetic force applied by the coil assembly 936. Since the magnet 932 is physically attached to rotating opto-mechanical barrel assembly 934, the variation in the electromagnetic force exerted on the magnet 932, by the coil assembly 936, is transferred to the rotating opto-mechanical barrel assembly 934. The imaging optics 914 is housed within rotating opto-mechanical barrel assembly 934. Therefore, adjustments made to the position of rotating opto-mechanical barrel assembly 934 have a direct impact on the position of the imaging optics 914. A stop member 938 is provided to impose a physical limit on the amount of movement which may be made by the rotating opto-mechanical barrel assembly 934.

As discussed above, the conventional means for adjusting the focus of the imaging optics includes movement of the imaging optics axially along the optical path. In accordance with the present disclosure, adjustments to the focus of the imaging optics are achieved by pivoting or rotating opto-mechanical barrel assembly 934 about a rotation axis which is defined by pivot pin 940. Pivot pin 940 is rotatably positioned within a hub 942 which is fixed within a portion of the opto-mechanical barrel assembly 934.

Figure 10:
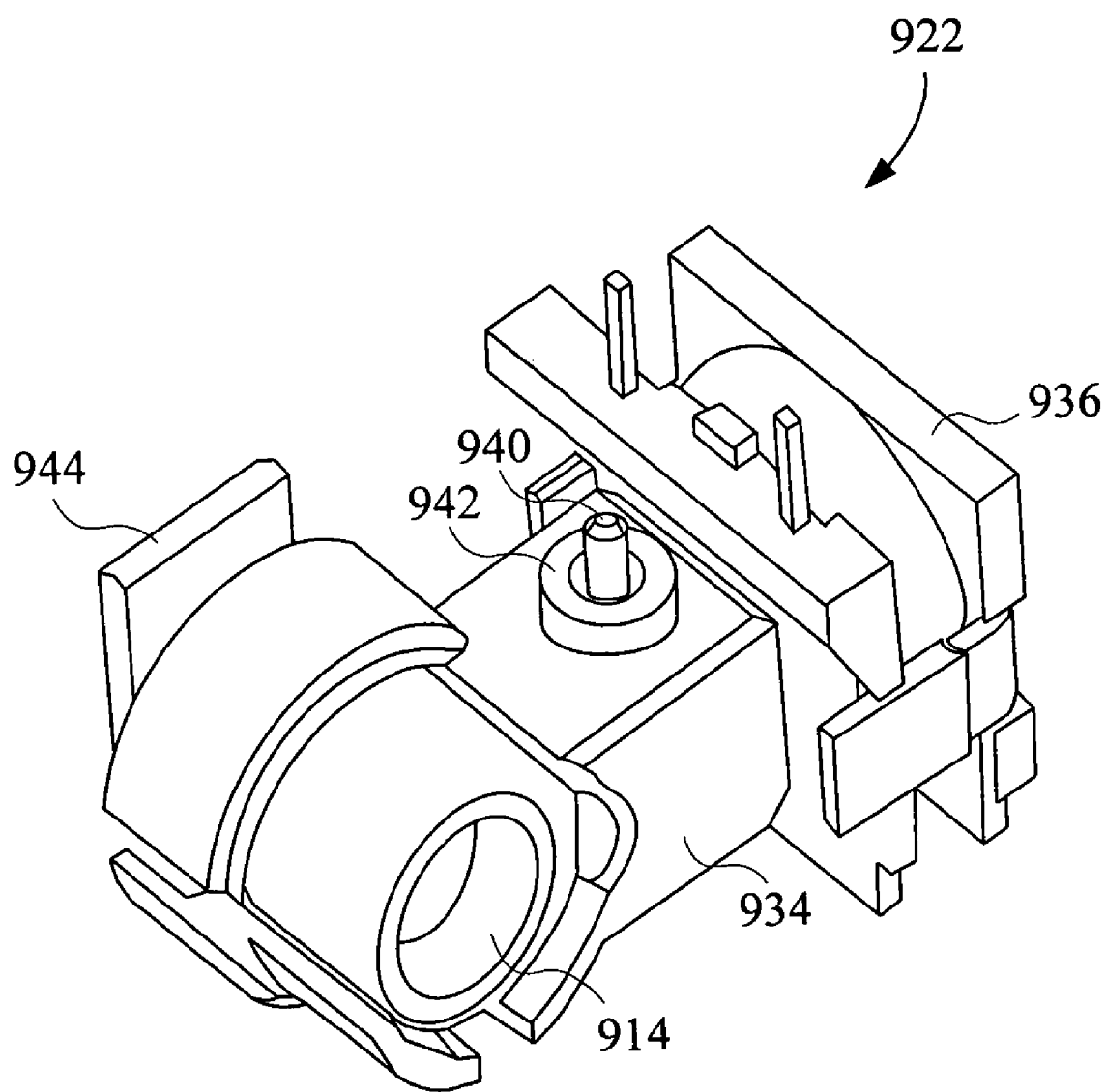
FIG. 10 is a perspective view of the pivoting arm design in accordance with the present invention.

FIG. 10 illustrates an isolated perspective view of the assembled electromagnetic motor assembly 922. The pivot pin 940 is maintained within hub 942 via a friction fit to minimize the susceptibility of the motor to movement due to thermal effects, gravity, dirt, or any other factor which may cause the motor to move out of the desired position. A bearing is fitted within hub 942 to provide a smooth finish for precision rotation of pivot pin 940 in small increments. A sensor 944 is positioned adjacent to the imaging optics 914.

Imaging optics 914 is configured to focus optical information on sensor 944. Sensor 944 produces electronic signals corresponding to an array of pixel information for the target image. The electronic signals from sensor 944 are transmitted to control and logic circuitry, such as, for example, PCB assembly 916. The control and logic circuitry process the signals and provide an output signal to an actuator assembly relative to the focus of the target image. The method for determining whether the target image is in focus and what the corresponding output signal should be is described in further detail in U.S. patent application Ser. No. 10/389,184, filed Mar. 14, 2003, which is incorporated by reference herein.

The structural characteristics of the rotating opto-mechanical barrel assembly 934 introduces a nominal angular error of one degree to the system as a result of performing the desired adjustment, i.e., preferably an 85+/−10 micron linear adjustment in under 20 milliseconds. The desired adjustment may be achieved through a one degree rotation of the opto-mechanical barrel assembly 934. By splitting the error between the two focus positions, a nominal error of less than 0.5 degrees is achieved and tolerated. Such a low error figure is achieved due to the exceedingly small amount of linear motion required to cause the desired focus adjustment. In application of the present invention, a statistical error of approximately two (2) degrees is considered to be the outer boundary for acceptable optical quality.

Figure 11:
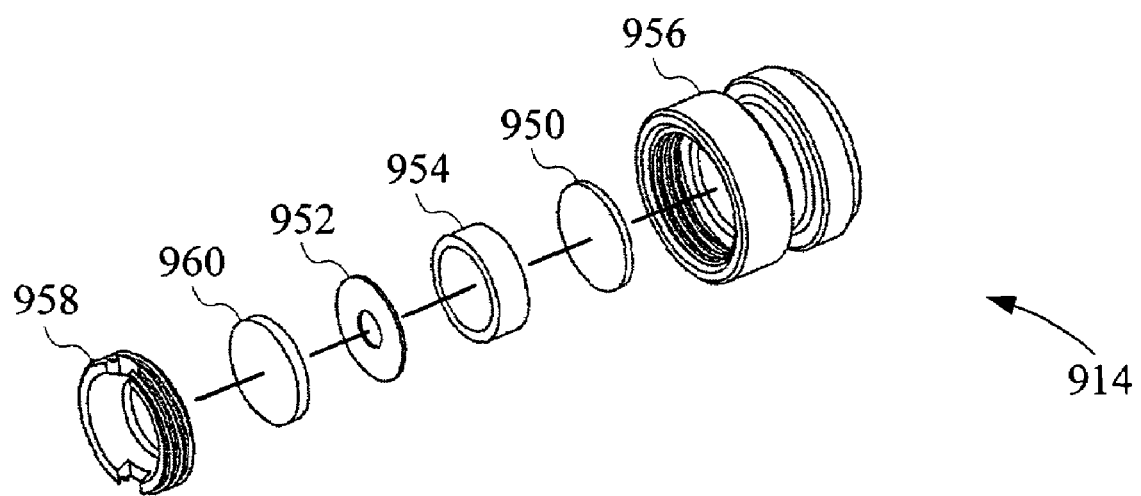
FIG. 11 is an exploded view of an imaging lens assembly in accordance with the present invention.

Referring now to FIG. 11, an exploded view of an imaging optics 914 in accordance with an embodiment of the present invention is illustrated. Imaging optics 914 includes a set of lenses 950, 954 and 960, an aperture plate 952, a lens holder 956, and a retaining ring 958. The components of imaging optics 914 are assembled sequentially into lens holder 956. The order of placement of the components begins with one lens 950 placed within lens holder 956 against a circumferential shoulder formed on the inner surface of lens holder 956. Next, the lens 954 and aperture 952 are inserted into the lens holder 956 and abutted against the first lens 950. The third lens 960 is inserted into the lens holder 956 adjacent to the aperture 952. Finally, retaining ring 958 is inserted into lens holder 956 and secured thereto via a threaded connection on an outer circumference of the retaining ring 958 and an inner circumference of lens holder 956. The assembled imaging lens assembly 914 is then subjected to various performance and structural testing known to one having ordinary skill in the art. It is contemplated that the components may be secured within lens holder 956 by other means known to one having ordinary skill in the art, such as, for example, by a snap-fit.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. An optical code reader comprising:
   a chassis;
   an imaging optics assembly housed within a mechanical barrel assembly pivotally mounted on the chassis;
   an assembly for receiving and processing image data generated by the imaging optics assembly; and
   means for focusing the imaging optics assembly on a target image, wherein a pivot pin rotatably connects the mechanical barrel assembly to the chassis, wherein the focus is adjusted by pivoting the imaging optics assembly about the pivot pin such that the imaging optics assembly pivots relative to the assembly for receiving and processing image data, and further such that a linear distance between the imaging optics assembly and the assembly for receiving and processing image data is adjusted.

2. The optical code reader according to claim 1, further comprising an illumination device for illuminating the target image.

3. The optical code reader according to claim 1, further comprising an aiming device for assisting a user in aiming the optical code reader on the target image.

4. The optical code reader according to claim 3, wherein the aiming device comprises a visual laser diode and a diffractive optical element lens assembly.

5. The optical code reader according to claim 1, further comprising a printed circuit board assembly for bi-directional transmission of signals of at least one of a plurality of input signals and a plurality of output signals.

6. The optical code reader according to claim 1, further comprising a motor assembly for focusing the imaging optics assembly on the target image.

7. The optical code reader according to claim 6, wherein the motor assembly comprises a magnet, and a coil assembly for applying an electromagnetic force on the magnet.

8. The optical code reader according to claim 7, wherein at least one power signal is transmitted to the coil assembly such that the coil assembly applies an electromagnetic force on the magnet, wherein the magnet is connected to the opto-mechanical barrel assembly thereby causing the opto-mechanical barrel assembly to pivot about the pivot pin to adjust the focus of the optical code reader.

9. The optical code reader according to claim 1, wherein the imaging optics assembly comprises a lens holder, a first lens positioned within the lens holder adjacent a circumferential shoulder formed on an inner surface of the lens holder, a second lens and an aperture positioned within the lens holder adjacent the first lens, a third lens positioned within the lens holder, and a retaining element for retaining the first, second and third lenses and the aperture within the lens holder.

10. The optical code reader according to claim 1, wherein the chassis is formed of zinc.

11. The optical code reader according to claim 1, wherein the imaging optics assembly is pivoted approximately one degree.

12. The optical code reader according to claim 11, wherein the pivot of approximately one degree results in an adjustment approximately equivalent to an 85 micron linear adjustment.

13. The optical code reader according to claim 12, wherein the adjustment is completed in less than 20 milliseconds.

14. A method for adjusting focus of an imaging optics assembly, the method comprising the steps of:
   providing an imaging optics assembly pivotally mounted on a chassis;
   receiving and processing image data generated by the imaging optics assembly via an image data receiving and processing assembly; and
   pivoting a mechanical barrel assembly housing the imaging optics assembly such that the imaging optics assembly is pivoted relative to the image data receiving and processing assembly such that a linear distance between the imaging optics assembly and the image data receiving and processing assembly is adjusted to focus the imaging optics assembly on a target image.

15. The method according to claim 14, further comprising the step of illuminating the target image.

16. The method according to claim 14, further comprising the step of aiming the imaging optics assembly on the target image.

17. The method according to claim 14, wherein the aiming device comprises a visual laser diode and a diffractive optical element lens assembly.

18. An optical code reader comprising:
   a chassis;
   an image data receiving and processing assembly connected to the chassis; and
   an opto-mechanical barrel assembly for housing an imaging optics assembly, wherein the opto-mechanical barrel assembly is pivotally mounted on the chassis such that pivotal movement of the opto-mechanical barrel assembly relative to the image data receiving and processing assembly alters a linear distance between the opto-mechanical barrel assembly and the image data receiving and processing assembly and adjusts the focus of the imaging optics assembly on a target image.

19. The optical code reader according to claim 18, further comprising an electromagnetic motor assembly for causing pivotal movement of the imaging optics assembly to adjust the focus on the target image.

20. The optical code reader according to claim 19, wherein the electromagnetic motor assembly comprises a magnet mounted on the opto-mechanical barrel assembly, a coil assembly for applying an electromagnetic force on the magnet, and a pivot pin for pivotally mounting the opto-mechanical barrel assembly on the chassis.

* * * * *